US009853595B1

(12) United States Patent
Okado (10) Patent No.: US 9,853,595 B1
(45) Date of Patent: Dec. 26, 2017

(54) FIXTURE FOR ON-ROOF INSTALLATION OBJECT AND FIXING STRUCTURE OF ON-ROOF INSTALLATION OBJECT

(71) Applicant: Yanegijutsukenkyujo Co., Ltd., Takahama-shi, Aichi (JP)

(72) Inventor: Katsuyuki Okado, Takahama (JP)

(73) Assignee: Yanegijutsukenkyujo Co., Ltd., Takahama-shi (JP)

( * ) Notice: Subject to any disclaimer, the term of this patent is extended or adjusted under 35 U.S.C. 154(b) by 61 days.

(21) Appl. No.: 15/240,716

(22) Filed: Aug. 18, 2016

(51) Int. Cl.
| | |
|---|---|
| *E04D 1/30* | (2006.01) |
| *H02S 20/23* | (2014.01) |
| *E04D 13/04* | (2006.01) |
| *E04B 1/41* | (2006.01) |
| *F24J 2/52* | (2006.01) |
| *E04B 1/38* | (2006.01) |

(52) U.S. Cl.
CPC .............. *H02S 20/23* (2014.12); *E04B 1/40* (2013.01); *E04D 1/30* (2013.01); *E04D 13/0481* (2013.01); *F24J 2/5245* (2013.01); *E04B 2001/405* (2013.01)

(58) Field of Classification Search
CPC ... E04D 1/30; E04D 13/147; E04B 2001/405; E04B 1/40; F24J 2002/5215; F24J 2002/5226; F24J 2/5205; F24J 2/5245
See application file for complete search history.

(56) References Cited

U.S. PATENT DOCUMENTS

| | | | | |
|---|---|---|---|---|
| 7,921,607 B2* | 4/2011 | Thompson | ............. | F24J 2/5245 248/237 |
| 8,479,455 B2* | 7/2013 | Schaefer | ............. | E04D 13/1476 174/564 |
| 9,153,950 B2* | 10/2015 | Yamanaka | ............. | H01L 31/05 |
| 2001/0023173 A1* | 9/2001 | Schiedegger | ............. | F24F 7/02 454/367 |
| 2002/0011043 A1* | 1/2002 | Freshwater | ............... | E04D 1/30 52/518 |
| 2006/0260670 A1* | 11/2006 | Terunuma | ............. | F24J 2/5203 136/244 |

(Continued)

FOREIGN PATENT DOCUMENTS

| | | |
|---|---|---|
| DE | 102013100646 A1 * | 7/2014 |
| JP | 2012-177291 A | 9/2012 |

(Continued)

*Primary Examiner* — Charles A Fox
*Assistant Examiner* — Charissa Ahmad
(74) *Attorney, Agent, or Firm* — Ken I Yoshida (57) ABSTRACT

A fixture includes a substitutive roof member that includes a base part, a base opening, a tubular wall that is erected from a peripheral edge of the base opening, a top face that extends inwardly from a top end of the tubular wall and forms a top face opening, and a pair of guide surfaces that each extend downward from peripheral sides of the top face opening, the substitutive roof member being made of a metal; and a mounting base that includes a pair of planar bottom plates that is provided in such a size as to pass through the top face opening, a pair of rising walls that are each erected from inner sides of the bottom plates, a connection part that connects upper sides of the rising walls, and a fixing member mounting part that is exposed at the connection part for mounting a bolt.

5 Claims, 9 Drawing Sheets (56) References Cited

U.S. PATENT DOCUMENTS

| | | | | |
|---|---|---|---|---|
| 2007/0220819 A1* | 9/2007 | Neuschafer | ............... | E04D 1/30 52/219 |
| 2013/0291456 A1* | 11/2013 | Desloover | ................. | E04D 1/08 52/173.3 |
| 2014/0208664 A1* | 7/2014 | Schaefer | ................... | E04C 3/06 52/58 |
| 2014/0223838 A1* | 8/2014 | West | ......................... | E04B 1/38 52/60 |
| 2014/0259988 A1* | 9/2014 | Kobayashi | ................ | E04D 1/30 52/126.1 |
| 2014/0331593 A1* | 11/2014 | Okada | ................... | F24J 2/5245 52/705 |
| 2016/0134230 A1* | 5/2016 | Meine | .................... | H02S 20/23 52/698 |

FOREIGN PATENT DOCUMENTS

| | | | | |
|---|---|---|---|---|
| JP | 2013130010 | A | * | 7/2013 |
| JP | 2014218841 | A | * | 11/2014 |
| JP | 2014237966 | A | * | 12/2014 |
| JP | 2015042814 | A | * | 3/2015 |

* cited by examiner

FIXTURE FOR ON-ROOF INSTALLATION OBJECT AND FIXING STRUCTURE OF ON-ROOF INSTALLATION OBJECT

BACKGROUND OF THE INVENTION

Field of the Invention

The present invention relates to a fixture for fixing an on-roof installation object, such as a solar cell module or a solar water heater, to a under roofing material; and to a fixing structure of the on-roof installation object that uses the fixture.

Description of the Related Art

As a fixture for fixing an on-roof installation object, such as a solar cell module or a solar water heater, to a under roofing material that supports a roof member, a technology in which a through hole is provided in a cover member that is substituted by the roof member, a mounting base on which the on-roof installation object is mounted is inserted in the through hole, and a lower end of the mounting base is brought into contact with the under roofing material is proposed (see Patent Document 1; Japanese Patent Application Laid-open No. 2012-177291). According to this technology, the entire weight of the on-roof installation object can be received directly by the under roofing material via the mounting base, and the on-roof installation object can be fixed with high strength. In the technology in Patent Document 1, since the weight of the on-roof installation object is not exerted upon the cover member, a ceramic that is the same as that used in roof tiles is used as the material of the cover member.

However, in the technology in Patent Document 1, since the cover member is made of a ceramic, when manufacturing the cover member, due to, for example, slight differences in clay compositions before firing or differences in firing temperatures caused by positional differences in a firing furnace, shrinkage during the firing tends to vary depending upon products, as a result of which variations in the dimensions of the products (cover members) tend to be large. Therefore, in order to make it possible to reliably insert the mounting base into the through hole in the cover member, the size of the through hole is made sufficiently larger than the mounting base. Consequently, when inserting the mounting base into the through hole and mounting the mounting base on the under roofing material, since a gap between the through hole and the mounting base is large, it is difficult to position the mounting base with respect to the cover member, thereby resulting in poor workability.
Patent Document 1: Japanese Patent Application Laid-open No. 2012-177291

SUMMARY OF THE INVENTION

Accordingly, in view of the above-described circumstances, it is an object of the present invention to provide a fixture for an on-roof installation object that is mounted to a under roofing material with high workability, and a fixing structure of the on-roof installation object that uses the fixture.

In order to achieve the above-mentioned object, a fixture for an on-roof installation object according to the present invention (hereunder, may also be simply referred to as the "fixture") "comprises a substitutive roof member that includes a plate-like base part, a base opening, a tubular wall, a top face, and a pair of plate-like guide surfaces, the base opening penetrating the base part, the tubular wall being erected from a peripheral edge of the base opening, the top face extending inwardly in a form of a plate from a top end of the tubular wall and forming a top face opening that is smaller than the base opening, the pair of plate-like guide surfaces each extending downward from a corresponding one of peripheral sides of the top face opening so as to oppose each other, the substitutive roof member being used in place of a roof member and being made of a metal or a synthetic resin; and a mounting base that includes a pair of planar bottom plates, a pair of rising walls, a connection part, and a fixing member mounting part, the planar bottom plates being provided in a row in such a size as to pass through the top face opening in the substitutive roof member, each rising wall being erected from an entire length of an inner-side side of a corresponding one of the pair of bottom plates, the connection part connecting upper sides of the pair of rising walls, the fixing member mounting part being exposed at a top surface of the connection part for mounting a bolt or a nut."

Examples of the "on-roof installation object" may include a solar cell module, a solar water heater, an on-roof greening member, and an outdoor unit for air-conditioning.

The term "roof member" refers to a piece for finishing a roof, the piece being typified by a roof tile. Other examples of the roof member may include, in addition to a roof tile, a slate plate, a metallic roof plate, and a wooden roof plate. If the "base part" of the substitutive roof member used in place of the roof member has the same external shape and external shape dimensions as those of the roof member, the base part easily covers, along with surrounding roof members, the under roofing material, and does not easily stand out from the surrounding roof members, so that the roof has good external appearance.

Examples of the "metal" of which the substitutive roof member is made may include aluminum alloys, iron, brass, nickel silver, bronze, and zinc. Examples of the "synthetic resin" may include polycarbonate, vinyl chloride, ABS resin, polyethylene, polypropylene, and fiber reinforced resin containing glass fiber or carbon fiber in the synthetic resin. The substitutive roof member may be molded by, for example, die casting, injection molding, cutting, pressing including drawing, and 3D printer molding.

Examples of the "fixing member mounting part" of the mounting base may include a "T-slot that is exposed at a top surface of the connection part and at at least one of the rising walls, and in which the head of a bolt or a nut is slidably mounted"; a "hole that penetrates the connection part and that is exposed at the top surface, and through which only a threaded shaft of the bolt passes"; and a "stepped hole that includes an accommodation part accommodating the head of a bolt or a nut that is recessed upward from a lower surface of the connection part, and a hole penetrating the connection part at the center of the accommodation part, exposed at the top surface, and through which only the threaded shaft of the bolt passes". Examples of the "bolt" may include a hexagon head bolt, a carriage bolt, a hexagon socket head cap screw, and a head-cut bolt. Examples of the "nut" may include a hexagon head nut, a square nut, and a T-slot nut.

The fixture having the present structure may be used as follows. First, the substitutive roof member is used in place of the roof member and is mounted on the under roofing material, the mounting base is inserted into the top face opening in the substitutive material, the bottom plate of the mounting base is brought into contact with the under roofing material, and the mounting base is fastened to the under roofing material. Here, a gap between the mounting base and the top face opening in the substitutive roof member is made uniform without unevenness as viewed from above to fasten the mounting base to the under roofing material. Thereafter, by mounting a bolt or a nut to the fixing member mounting part of the mounting base, and fastening a part of the on-roof installation object to the mounting base by using the bolt or the nut, the on-roof installation object can be fixed to the under roofing material via the mounting base.

According to the fixture having the present structure, the substitutive roof member is made of a metal or a synthetic resin. Therefore, compared to that made of a ceramic, variations in product dimensions are small, and dimensional precision of the product is high, so that it is possible to provide the substitutive roof member so that the gap between the top face opening and the mounting base is made as small as possible. Consequently, by reducing the size of the gap between the mounting base and the top face opening in the substitutive roof member, it becomes easy to recognize any displacement of the mounting base with respect to the top face opening, so that it is easy to position the mounting base with respect to the substitutive roof member.

The pair of guide surfaces of the substitutive roof member can guide the mounting base from the top face opening up to the vicinity of the under roofing material. Therefore, the mounting base is easily brought into contact with the under roofing material with the mounting base positioned with respect to the top face opening, so that mounting workability with respect to the under roofing material is good.

Making the substitutive roof member out of a metal or a synthetic resin increases the dimensional precision of the substitutive roof member. Therefore, a substitutive roof member that does not have the top face, the top face opening, and the guide surfaces due to the dimensions of the inner periphery of the tubular wall being made closer to the dimensions of the outer periphery of the mounting base may be employed. Even in this case, since the gap with respect to the mounting base is small, as described above, the mounting base is easily positioned with respect to the substitutive roof member. However, in such a substitutive roof member, the width of a top end surface of the tubular wall is the same as the thickness of the tubular wall, and becomes thinner. Therefore, when a top end opening of the tubular wall is covered with the cover member via the sealing member such that rainwater does not flow into the tubular wall from the top end opening, since the width for sealing at the top end surface is small, sufficient sealablity cannot be realized, as a result of which the rainwater may flow into the top end opening. In contrast, in the present structure, since the top end of the tubular wall has the plate-like top face, when the top face opening at the top end side of the tubular wall is covered with the cover member via the sealing member, the top face having a width that is larger than the thickness of the tubular wall allows the sealability with respect to the sealing member to be sufficient.

As in the technology in Patent Document 1, causing the external shape of the mounting base to be a rectangular parallelepiped shape may be employed. However, in the case where the mounting base has a rectangular parallelepiped shape, if a portion of the mounting base that projects above the top face opening is small when the mounting base has been inserted into the top face opening in the substitutive roof member and has been brought into contact with the under roofing material, an operator will have difficulty grasping the mounting base, and the positioning of the mounting base with respect to the substitutive roof member becomes difficult to perform. In contrast, in the present structure, since, at the mounting base, the rising walls are each erected from the inner side of a corresponding one of the pair of bottom plates, the rising walls are positioned inwardly from outer sides of the bottom plates; and, when the mounting base is inserted into the top face opening in the substitutive roof member, a space into which, for example, operator's fingers are inserted is provided between the top face opening and each rising wall. Therefore, even in a state in which the mounting base is inserted in the top face opening in the substitutive roof member and is in contact with the under roofing material, the operator can grasp the pair of rising walls, so that the positioning of the mounting base with respect to the substitutive roof member is easily performed.

In addition to having the above-described structure, the fixture for an on-roof installation object according to the present invention may have a structure in which "the substitutive roof member further includes an identification part that is provided at the top face so as to be disposed on a line passing between the pair of guide surfaces, and that extends parallel to the peripheral sides, from which the guide surfaces extend downward, of the top face opening."

Examples of the "identification part" may include a groove, a projection, an applied coating, and an adhered seal.

According to the fixture having the present structure, since the top face of the substitutive roof member has the identification part that extends parallel to the pair of guide surfaces, the identification part can also serve as an indicator for the position of the mounting base with respect to the top face opening, so that the positioning of the mounting base with respect to the substitutive roof member is easily performed.

In addition to having the above-described structures, the fixture for an on-roof installation object according to the present invention may have a structure in which "the substitutive roof member further includes a pair of projecting strips that project from a top surface of the base part at locations that are closer to an eaves side than the tubular wall is; extend in a direction connecting an eaves end and a ridge end; and are spaced from a center in a direction at right angles to the direction connecting the eaves end and the ridge end."

In a roof covered with roof members in a staggered arrangement in a roof inclination direction, with respect to one roof member, at a ridge side and an eaves side, there are portions where roof members overlap each other in a direction at right angles to the inclination direction. Such portions are positioned at substantially the center of a ridge-side edge and the center of an eaves-side edge of the one roof member. When rainwater flows down onto the portions where such roof members overlap each other, the rainwater easily flows into a space below the roof members (to the under roofing material) via a gap between the roof members.

In contrast, in the fixture having the present structure, when the rainwater flows onto the base part of the substitutive roof member from the ridge side of the roof, after the rainwater has flowed along an outer wall of the tubular wall due to the tubular wall projecting from the center of the base part, the rainwater is about to flow around to the eaves side of the tubular wall. However, the rainwater is prevented from flowing around to the eaves side of the tubular wall by the pair of projecting strips. Therefore, the rainwater does not flow into an inner space between the pair of projecting strips, but flows to outer sides of the pair of projecting strips, and can be discharged from the eaves-side edge onto the roof members at the eaves side of the substitutive roof member.

Consequently, since the rainwater that has flowed to the substitutive roof member from the ridge side is not discharged onto the portion where the roof members overlap each other at the eaves side of the substitutive roof member, it is possible to prevent the rainwater from flowing through a space between the roof members to the under roofing material.

A fixing structure of an on-roof installation object according to the present invention (also called "the fixing structure" below) is one "in which the on-roof installation object is fixed to a under roofing material by the fixture for the on-roof installation object, wherein the substitutive roof member is used in place of the roof member and is mounted on the under roofing material, and, with a gap provided between the mounting base and the top face opening in the substitutive roof member, the mounting base is mounted on the under roofing material, and wherein the on-roof installation object is fixed via the bolt or the nut that is mounted to the fixing member mounting part of the mounting base."

The term "under roofing material" refers to a roof bed material on which roof members are placed. In general, the under roofing material has a structure including a waterproof sheet that is laid on a plate-like roof board mounted on a rafter.

Accordingly, as an advantageous effect of the present invention, it is possible to provide a fixture for an on-roof installation object that is mounted to a under roofing material with high workability, and a fixing structure of an on-roof installation object that uses the fixture.

DESCRIPTION OF THE EMBODIMENTS

A fixture 1 for fixing an on-roof installation object and a fixing structure of an on-roof installation object according to an embodiment of the present invention are described with reference to FIGS. 1 to 5. The fixture 1 according to the present embodiment primarily includes a substitutive roof member 10, a mounting base 30, and a cover member 50.

Figure 1:
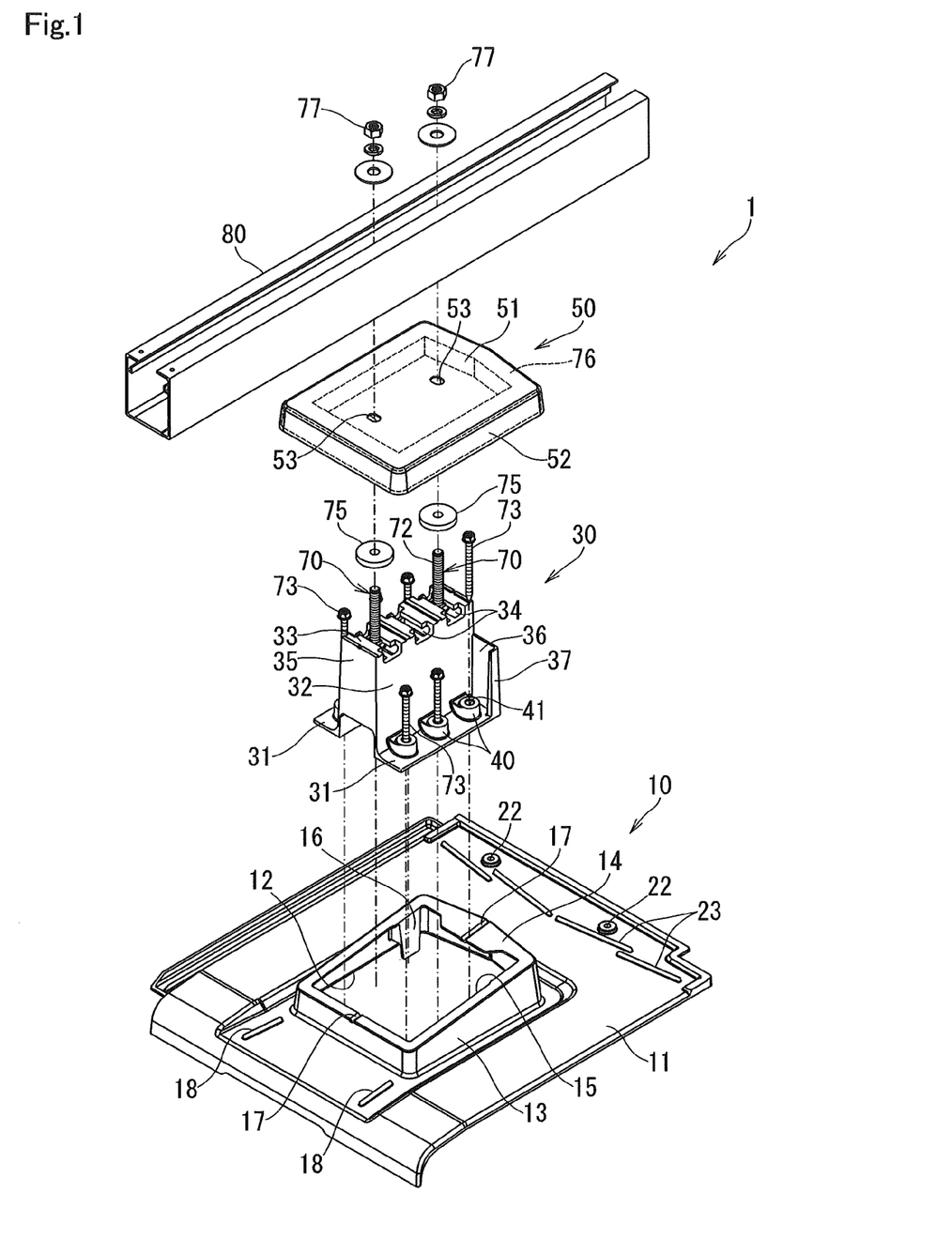
FIG. 1 is a disassembled perspective view of a fixture for an on-roof installation object according to an embodiment of the present invention.
Figure 2A:
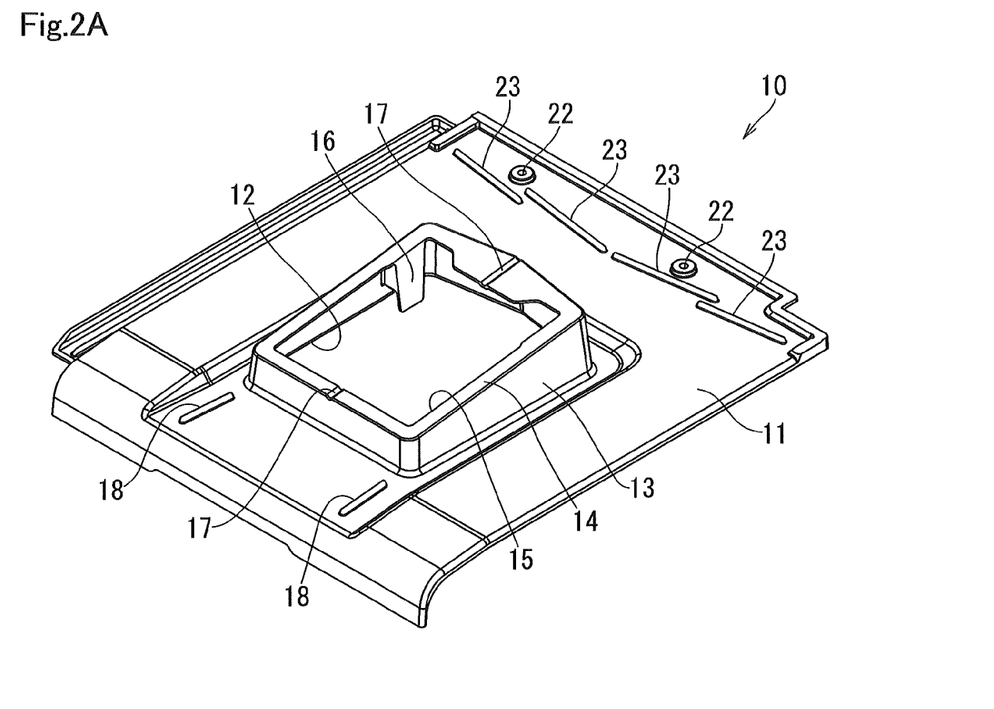
FIG. 2A is a perspective plan view of a substitutive roof member of the fixture in FIG. 1.
Figure 2B:
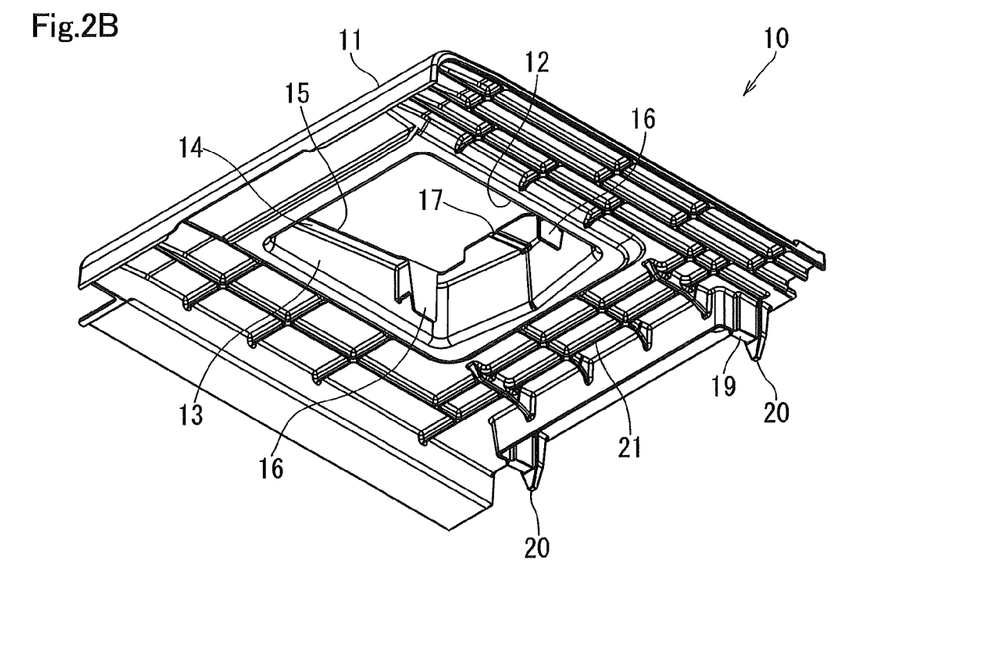
FIG. 2B is a perspective bottom view of the substitutive roof member of the fixture in FIG. 1.

More specifically, the substitutive roof member 10 is used in place of a roof member 65, and is made of an aluminum alloy by die casting. The substitutive roof member 10 includes a plate-like base part 11, a base opening 12 that penetrates the base part 11, a tubular wall 13 that is erected from peripheral edges of the base opening 12, a top face 14 that extends inwardly in the form of a plate from an upper end of the tubular wall 13 and that forms a top face opening 15 that is smaller than the base opening 12, and a pair of plate-like guide surfaces 16 that extend downward each from a corresponding peripheral side of the top face opening 15 so as to oppose each other.

The base part 11 is such that, of two end-portions thereof in a direction at right angles to a roof inclination direction connecting an eaves end and a ridge end (hereunder called a "roof horizontal direction"), an eaves-side end portion at an end-portion (left end portion in FIG. 2) that overlaps a lower portion of an adjacent roof member 65 is situated closer to the ridge side than an eaves-side end portion at a remaining portion is. The base part 11 has an external shape and a top surface shape and external shape dimensions and top surface shape dimensions that are the same as those of flat tiles used as roof members 65. Therefore, although not shown, the roof members 65 are also such that the eaves-side end portion at a corresponding end-portion is situated closer to the ridge side.

The base opening 12 is provided in the center of the base part 11 and has a substantially rectangular shape extending in the roof inclination direction. The center of a ridge-side side thereof is bent so as to project towards the ridge. Since the tubular wall 13 is erected from the peripheral edges of the base opening 12, an outer peripheral surface facing the ridge among outer peripheral surfaces thereof is bent. The tubular wall 13 is inclined such that the height of a top end of the tubular wall 13 becomes smaller from the ridge side to the eaves side with respect to the top surface of the base part 11. The inclination angle of the top end of the tubular wall 13 is set to an angle that allows the top end of the tubular wall 13 to be substantially parallel to a under roofing material 60 when the substitutive roof member 10 is mounted on the under roofing material 60.

The top face opening 15 has a substantially rectangular shape extending in the roof inclination direction. The center of a ridge-side side of the top face opening 15 projects inward (eaves direction) in the form of a trapezoid. At two of peripheral sides of the top face opening 15 that are parallel to the roof inclination direction, the pair of guide surfaces 16 are provided within a range of a length that is approximately ¼ of the entire length from a ridge-side end so as to extend downward to a height that is substantially the same as the height of the top surface of the base part 11. The pair of guide surfaces 16 are inclined such that an interval between bottom sides thereof is smaller than an interval between top sides thereof.

The substitutive roof member 10 also includes identification parts 17, a pair of projecting strips 18, a pedestal part 19, protruding parts 20, reinforcing ribs 21, two fixing holes 22, and four barrier parts 23. The identification parts 17 extend in the top face 14 so as to be parallel to the roof inclination direction. The pair of projecting strips 18 project from the top surface of the base part 11 at locations that are closer to the eaves side than the tubular wall 13 is, extend in the roof inclination direction, and are spaced from a center in the roof horizontal direction. The pedestal part 19 projects downward from a lower surface of a ridge-side end portion of the base part 11. The protruding parts 20 project downward from a ridge-side end portion of the pedestal part 19. The reinforcing ribs 21 project downward in the form of a lattice at substantially the entire lower surface of the base part 11. The two fixing holes 22 penetrate the vicinity of the ridge-side end portion of the base part 11. The four barrier parts 23 project from the top surface of the base part 11 so as to be closer to the eaves side than the two fixing holes 22 are, extend in the roof horizontal direction, and are arranged in a row in the roof horizontal direction.

The identification parts 17 are each provided in the form of a groove on a center line provided between the pair of guide surfaces 16, the grooves being parallel to the peripheral sides, where the guide surfaces 16 extend downward, of the top face opening 15. The identification parts 17 are such that one identification part 17 is closer to the ridge side than the top face opening 15 is, and the other identification part 17 is closer to the eaves side than the top face opening 15 is. The pair of projecting strips 18 are each provided closer to the center in the roof horizontal direction than extension lines extending from the outer peripheral surfaces of the tubular wall 13 along the roof inclination direction are. The two fixing holes 22 are positioned above the pedestal part 19, and their hole-edges at a top surface side of the base part 11 bulge upward from the top surface of the base part 11. The four barrier parts 23 are each inclined such that an end portion thereof at a side that is closer to the center of the base part 11 is positioned closer to the eaves side than the other end portion thereof. A portion of the base part 11 including the two fixing holes 22 and the four barrier parts 23 is covered from thereabove by a roof member 65 that is disposed adjacent to its ridge side. By the reinforcing ribs 21, the strength and the rigidity of the substitutive roof member 10 are maintained while making the substitutive roof member 10 lighter by reducing the overall parts thickness.

In the present embodiment, the shape of the base part 11 is the same as the shape of a flat (F-shaped) tile. However, when the substitutive roof member 10 is used in place of the tile, the base part 11 may have a shape that is the same as the shape of, for example, a J-shaped tile, an S-shaped tile, a Spanish tile, or a tile in honbuki-style (a style of tile roofing in which round and square tiles are laid down alternately), in addition that of the F-shaped tile. Since the substitutive roof member 10 is made of an aluminum alloy (aluminum die cast), compared to the case in which the substitutive roof member 10 is made of a ceramic, the substitutive roof member 10 is light in weight, and does not easily break when being transported or mounted.

Figure 3A:
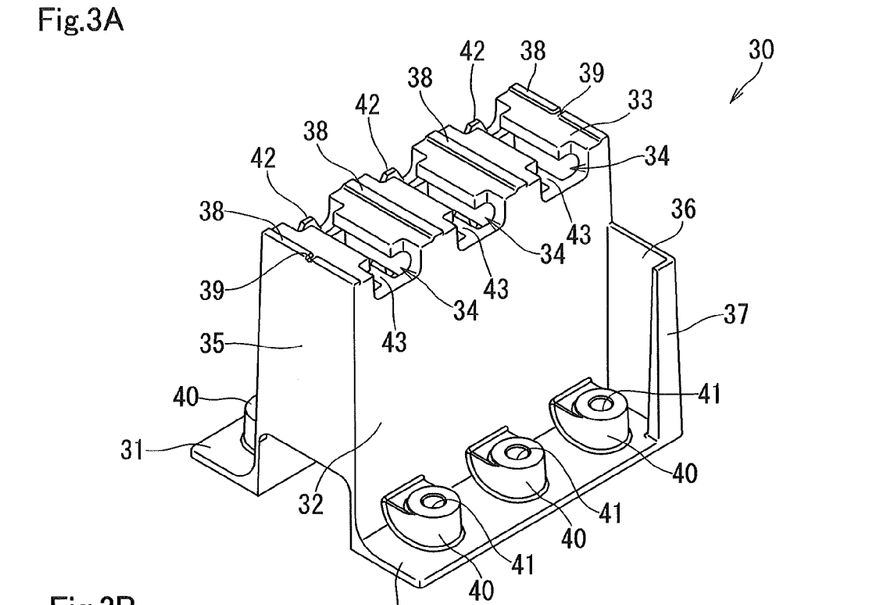
FIG. 3A is a perspective front view of a mounting base of the fixture in FIG. 1.
Figure 3B:
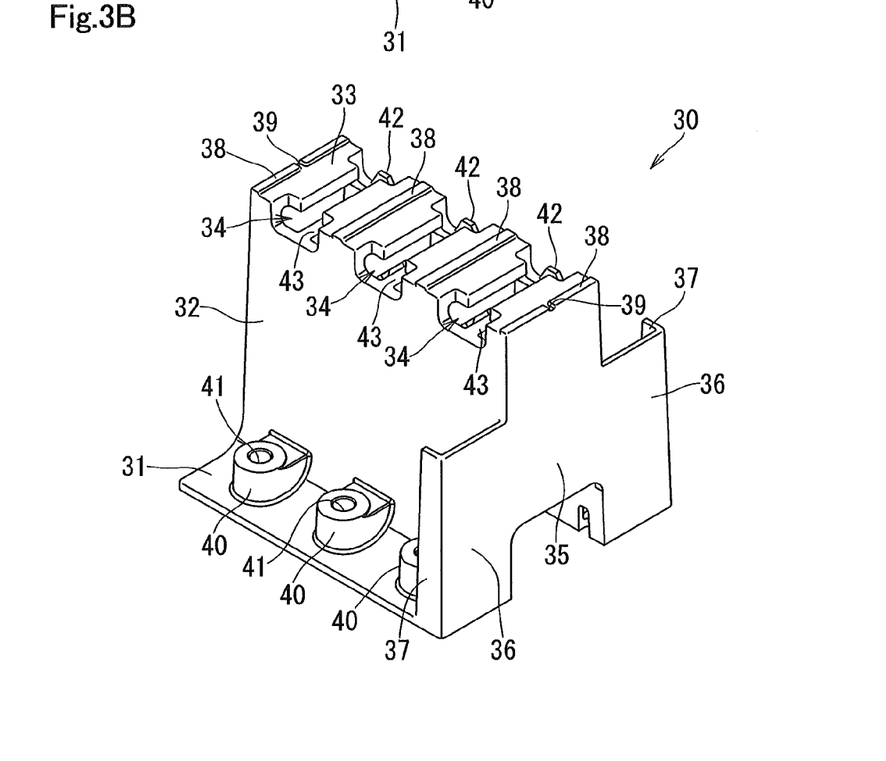
FIG. 3B is a perspective back view of the mounting base of the fixture in FIG. 1.

The mounting base 30 includes a pair of planar bottom plates 31, a pair of rising walls 32, a connection part 33, a plurality of (three) fixing member mounting parts 34, plate-like side walls 35, a pair of extending parts 36, and a pair of guided surfaces 37. The rising walls 32 are each erected over an entire length of an inner-side side of a corresponding one of the pair of bottom plates 31. The connection part 33 connects upper sides of the pair of rising walls 32. The fixing member mounting parts 34 are provided in the connection part 33. The side walls 35 connect vertically extending sides of the pair of rising walls 32. The extending parts 36 extend sideways from the respective rising walls 32 to outer-side sides of the respective bottom plates 31. The guided surfaces 37 extend a short distance along the outer-side sides of the bottom plates 31 from side ends of the respective extending parts 36.

The mounting base 30 also includes a plurality of placement projecting parts 38 that project from a top surface of the connection part 33, recessed parts 39 that are recessed in some of the placement projecting parts 38 and up to the top surface of the connection part 33, a plurality of boss parts 40 that each project upward from a top surface of a corresponding one of the bottom plates 31, and mounting holes 41 that penetrate the respective boss parts 40 and the corresponding bottom plates 31.

The external shapes of the pair of bottom plates 31 are each a rectangular shape. The pair of bottom plates 31 are provided in a row in such a size as to pass through the top face opening 15 in the substitutive roof member 10. The pair of rising walls 32 are set such that when the mounting base 30 has been inserted into the top face opening 15 in the substitutive roof member 10 mounted on the under roofing material 60 and the pair of bottom plates 31 have been brought into contact with the under roofing material 60, the heights from bottom ends to top ends of the rising walls 32 are heights at which top ends of the pair of rising walls 32 are positioned above the top face opening 15.

The plurality of fixing member mounting parts 34 are such that three fixing member mounting parts 34 are disposed side by side in the connection part 33 at equal intervals in a direction at right angles to the direction in which the pair of bottom plates 31 are disposed in a row. Each fixing member mounting part 34 is a groove that has an inverted T shape, extends so as to penetrate the pair of rising walls 32 from one side to the opposite side thereof, and is opened at the top surface of the connection part 33. That is, each fixing member mounting part 34 is a T slot. At one of the pair of rising walls 32, the fixing member mounting parts 34 are partially closed by stoppers 42 projecting upward from the bottoms of the grooves. In addition, the fixing member mounting parts 34 are such that the bottoms of the grooves are formed by bridging parts 43 that bridge the pair of rising walls 32. By this, the fixing member mounting parts 34 are such that the heads of bolts or nuts can be inserted and slid into the grooves from one rising wall 32 where the stoppers 42 are not projected. The heads of the bolts or the nuts are prevented from being removed from the opposite side by the stoppers 42, and are prevented from falling by the bridge parts 43.

Top sides of the pair of side walls 35 are connected to the connection part 33, and bottom sides of the pair of side walls 35 are positioned above the bottom plates 31. By this, when the mounting base 30 is mounted on the under roofing material 60, a space that penetrates the mounting base 30 is provided between each side wall 35 and the under roofing material 60. The pair of extending parts 36 each extend along an end side of the corresponding bottom plate 31 from one of two vertically extending sides of a corresponding one of the pair of rising walls 32. The pair of extending parts 36 each extend to a height that is lower than the height of the corresponding one of the rising walls 32 from the corresponding one of the bottom plates 31 (height that is approximately ⅔ of that of the corresponding one of the rising walls 32).

At the top surface of the connection part 33, the plurality of placement projecting parts 38 are provided at two end sides of the two side walls 35, and between adjacent two of the three fixing member mounting parts 34; and extend in directions in which the pair of rising walls 32 oppose each other. Top surfaces of the plurality of placement projecting parts 38 are flush with each other. The recessed parts 39 are provided, one in the placement projecting part 38 at an eaves-side end side of the top surface of the connection part 33 and the other in the placement projecting part 38 at a ridge-side end side of the top surface of the connection part 33, and are each recessed at the center of the corresponding placement projecting part 38 in a longitudinal direction thereof (roof horizontal direction). The plurality of boss parts 40 are such that a set of three boss parts 40 is provided at an outer side of a corresponding one of the pair of rising walls 32 in a direction in which an outer-side side of the corresponding bottom plate 31 extends, the three boss parts 40 of each set provided at equal intervals. Each boss part 40 is such that the vicinity of the corresponding mounting hole 41 at a top surface thereof bulges one step higher. The mounting base 30 according to the present embodiment is formed by die casting using an aluminum alloy.

The cover member 50 includes a planar top plate 51, a peripheral wall 52 that extends downward from peripheral edges of the top plate 51, and through holes 53 that penetrate the top plate 51. The top plate 51 and the peripheral wall 52 have external shapes that are similar to the external shape of the tubular wall 13 of the substitutive roof member 10. That is, the top plate 51 and the peripheral wall 52 have an overall rectangular shape and are shaped such that the center of one side is bent so as to project outward. The top plate 51 and the peripheral wall 52 are one size larger than the tubular wall 13 of the substitutive roof member 10. By this, a top portion of the tubular wall 13 of the substitutive roof member 10 can be covered from thereabove by the cover member 50.

The through holes 53 are slotted holes that extend in a direction orthogonal to two parallel peripheral sides among peripheral sides of the top plate 51. When the mounting base 30 has been positioned below and at the center of the cover member 50, the through holes 53 are positioned in correspondence with the centers of the outer two fixing member mounting parts 34 among the three fixing member mounting parts 34 of the mounting base 30. The cover member 50 according to the embodiment is made from, for example, a metal plate, such as a stainless steel plate or an aluminum alloy plate, or a synthetic resin having good weather resistance.

Figure 4:
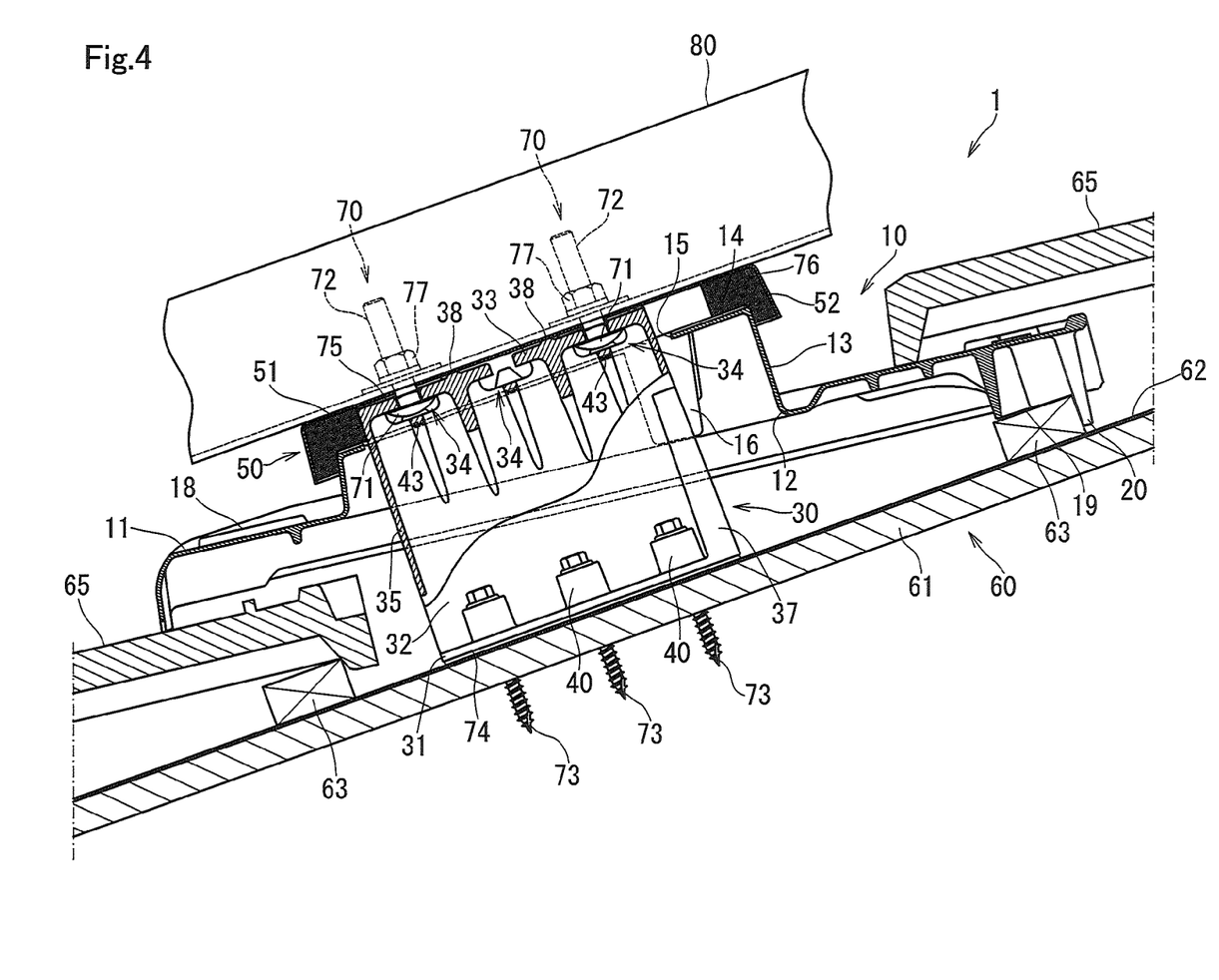
FIG. 4 is a sectional view of a fixing structure in which an on-roof installation object is fixed by the fixture in FIG. 1.
Figure 5:
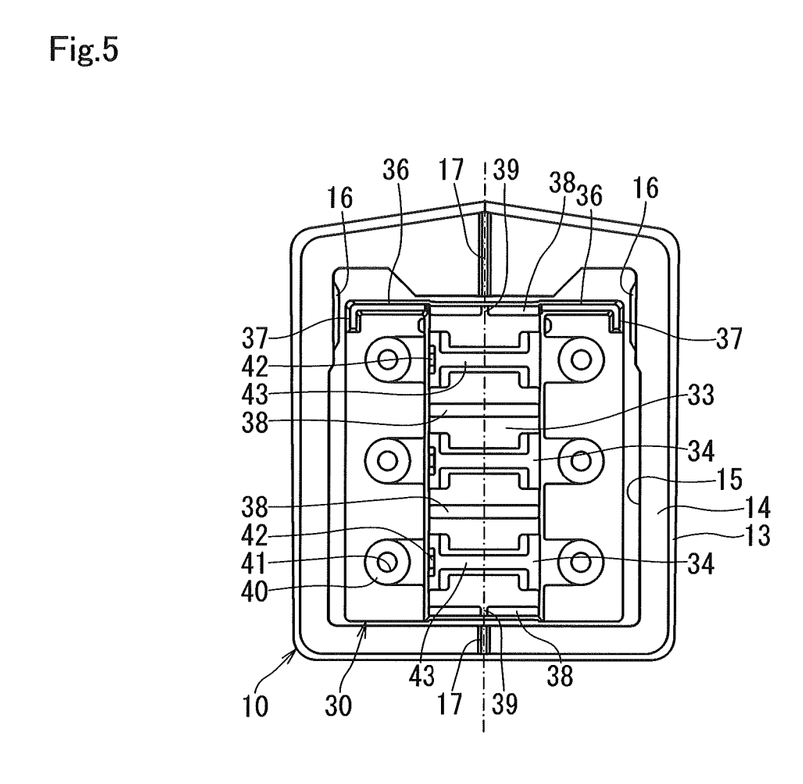
FIG. 5 is a partial enlarged plan view showing a relationship between the substitutive roof member and the mounting base of the fixture in FIG. 1.
Figure 6:
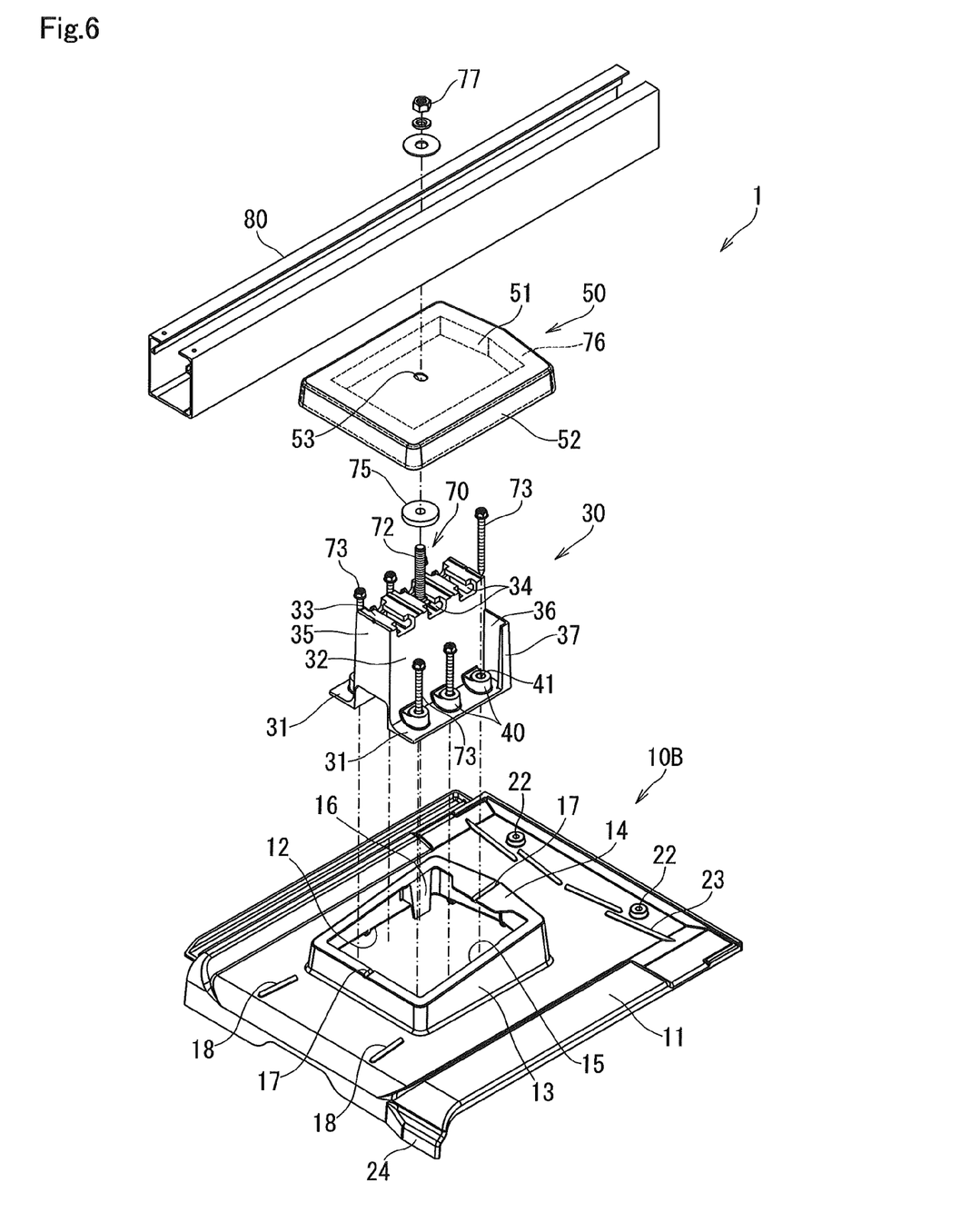
FIG. 6 is a disassembled perspective view of the fixture that includes a substitutive roof member having a different form.
Figure 7A:
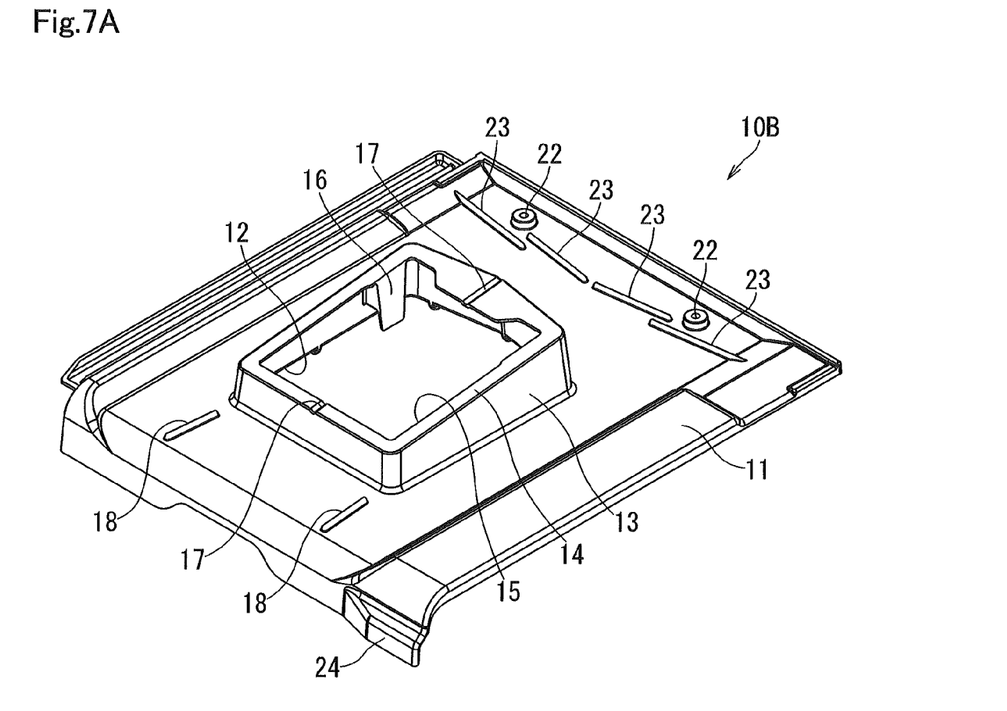
FIG. 7A is a perspective plan view of the substitutive roof member of the fixture in FIG. 6.
Figure 7B:
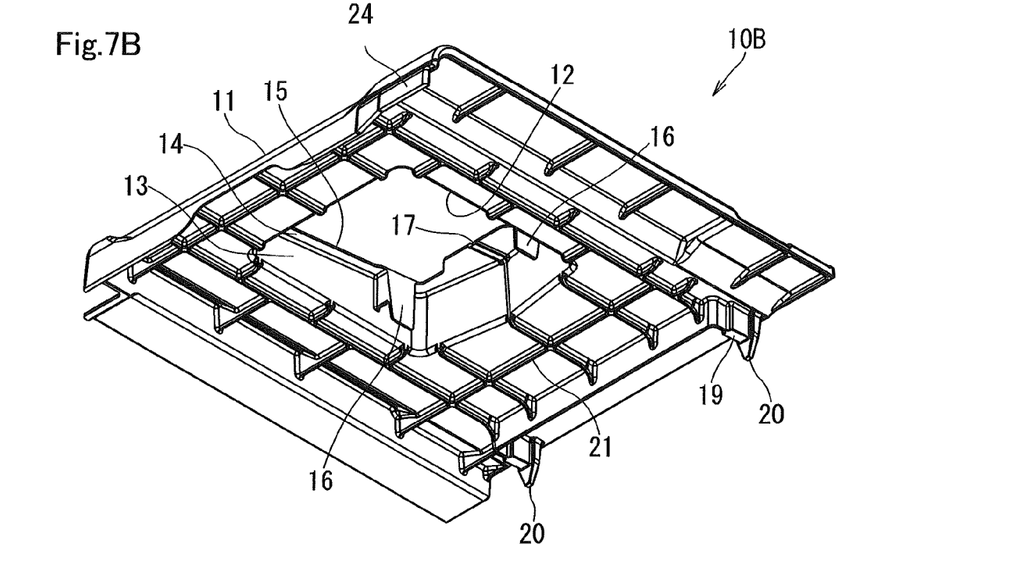
FIG. 7B is a perspective bottom view of the substitutive roof member of the fixture in FIG. 6.
Figure 8:
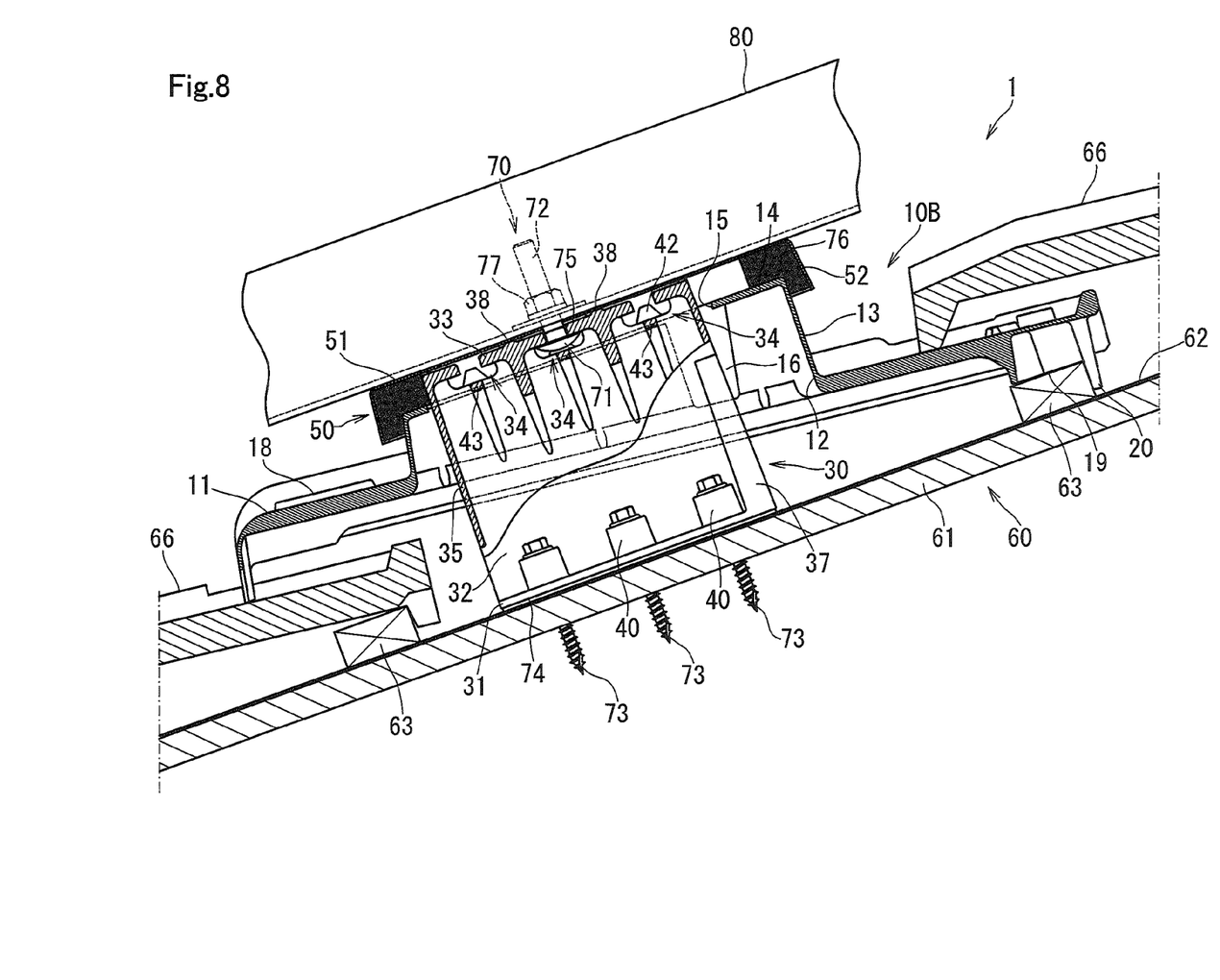
FIG. 8 is a sectional view of a fixing structure in which the on-roof installation object is fixed by the fixture in FIG. 6.
Figure 9:
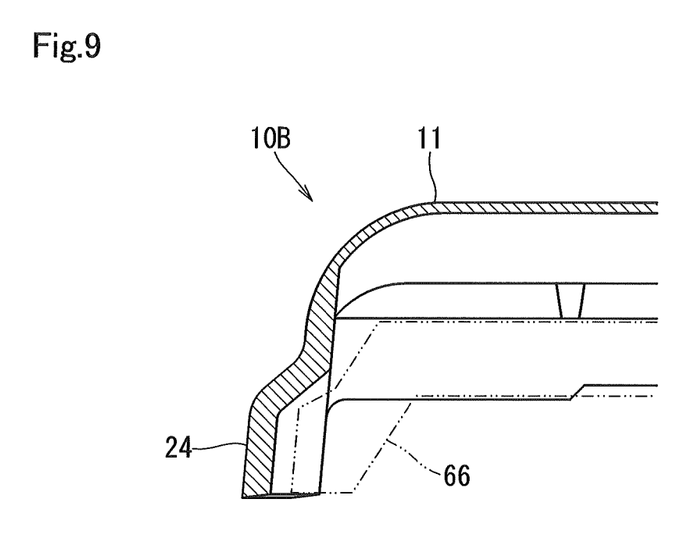
FIG. 9 is an enlarged sectional view of a bulging part of the substitutive roof member of the fixture in FIG. 6.

Next, a method of use of the fixture 1 according to the present embodiment is described primarily with reference to FIG. 4. In FIG. 4, only a top portion of the mounting base 30 is shown in cross section, and a lower portion of the mounting base 30 represents a side surface thereof.

First, the under roofing material 60 of the roof on which the fixture 1 is mounted includes a roof board 61 and a waterproof sheet 62 that is laid on a top surface of the roof board 61. Long crosspieces 63 that extend in the roof horizontal direction are mounted on the under roofing material 60 at equal intervals in the roof inclination direction. By causing tiles, which are roof members 65, to be caught by and held by the crosspieces 63, a large number of tiles cover the top surface of the under roofing material 60. Although not shown, a large number of tiles (roof members 65) cover the top surface of the under roofing material 60 in a staggered form in the roof inclination direction.

When mounting the fixture 1 on the roof, in place of the roof member 65 that is in correspondence with a mounting position of the fixture 1, the substitutive roof member 10 is mounted on the under roofing material 60. At this time, with the pedestal part 19 of the substitutive roof member 10 being placed on a crosspiece 63 and the protruding parts 20 being in contact with a surface of the crosspiece 63 that faces the ridge side, nails inserted in the fixing holes 22 from thereabove are driven into the crosspiece 63 to fix the substitutive roof member 10. This causes the under roofing material 60 to be in a state in which it is exposed through the top face opening 15 in the substitutive roof member 10.

Next, the mounting base 30 is to be inserted into the top face opening 15 in the substitutive roof member 10. Prior to the insertion, bolts 70, which are fixing members, are mounted to the fixing member mounting parts 34. In the present embodiment, with respect to the outer two fixing member mounting parts 34 of the three fixing member mounting parts 34, from one of the opened rising wall 32 sides, heads 71 of the inverted bolts 70 are inserted, and threaded shafts 72 of the bolts 70 are caused to project upward from the top surface of the connection part 33. By causing two parallel surfaces of quadrangular prism shaped portions of the heads 71 to contact inner surfaces of the grooves of the corresponding fixing member mounting parts 34, the bolts 70 mounted to the corresponding fixing member mounting parts 34 become unrotatable around the axes of the threaded shafts 72 and become slidable only in a direction in which the corresponding fixing member mounting parts 34 extend. In the present embodiment, carriage bolts are illustrated as the bolts 70. However, hexagon head bolts may also be used as the bolts 70.

With end sides of the bottom plates 31 connected to the respective extending parts 36 being faced to a ridge side of the roof, the mounting base 30 on which the bolts 70 have been mounted as described above is inserted into the top face opening 15 in the substitutive roof member 10, and the pair of bottom plates 31 are brought into contact with the under roofing material 60. At this insertion, the pair of guided surfaces 37 are guided by the pair of guide surfaces 16 of the substitutive roof member 10.

The mounting base 30 is positioned at the center of the top face opening 15 in the substitutive roof member 10. More specifically, the mounting base 30 can be easily positioned with respect to the substitutive roof member 10 by positioning the mounting base 30 such that the two recessed parts 39 of the mounting base 30 are on a straight line (alternate long and short dash line in FIG. 5) connecting the two identification parts 17 of the substitutive roof member 10 and such that a gap with respect to the top face opening 15 (gap between the guide surfaces 16 and the guided surfaces 37) is uniform. Since the pair of guide surfaces 16 of the substitutive roof member 10 and the pair of guided surfaces 37 of the mounting base 30 face each other, looking at the gap between the guide surfaces 16 and the guided surfaces 37 allows any displacement of the mounting base 30 with respect to the substitutive roof member 10 to be easily recognized, so that the gap can serve as an indicator for positioning.

When the mounting base 30 has been positioned with respect to the substitutive roof member 10, screws 73 are inserted into the respective mounting holes 41 to fasten the pair of bottom plates 31 to the under roofing material 60. Here, since the mounting holes 41 are provided in the upwardly projecting boss parts 40, the screws 73 inserted in the mounting holes 41 stand on their own without falling, so that the fastening operation with respect to the under roofing material 60 by using the screws 73 is facilitated. Before mounting the mounting base 30 on the under roofing material 60, a seal sheet 74, which is made of, for example, butyl rubber, is interposed between the under roofing material 60 and the bottom plates 31. By the seal sheet 74, it is possible to prevent rainwater from flowing along the screws 73 and going below the under roofing material 60.

When the mounting base 30 has been mounted on the under roofing material 60, the threaded shafts 72 of the bolts 70 projecting upward from the connection part 33 are successively inserted into elastic annular seal rings 75 and the through holes 53 in the cover member 50 from below the seal rings 75 and the through holes 53. Then, the top plate 51 is placed on the placement projecting parts 38 of the mounting base 30 such that the peripheral wall 52 of the cover member 50 surrounds an outer periphery of the top portion of the tubular wall 13 of the substitutive roof member 10. Here, with an elastic seal member 76 made of, for example, foamed rubber being mounted on (bonded to) inner sides of the cover member 50, the cover member 50 is placed.

By this, the seal rings 75 are brought into a state in which, by the top plate 51, the seal rings 75 are compressed and accommodated in a gap between the connection part 33 and the top plate 51, and the through holes 53 in the cover member 50 are sealed in a good state. In addition, the top face opening 15 in the substitutive roof member 10 is covered by the cover member 50, and a portion between the cover member 50 and the tubular wall 13 is sealed by the seal member 76. Here, since the seal member 76 is in surface-contact with the top face 14 of the tubular wall 13, sufficient sealability is provided by the seal member 76. Consequently, it is possible to prevent rainwater from flowing down to be below the substitutive roof member 10 via the top face opening 15.

In this way, by covering the top face opening 15 in the substitutive roof member 10 by the cover member 50, the threaded shafts 72 of the two bolts 70 are brought into a state in which they project upward from a top surface of the top plate 51. The on-roof installation object is mounted on the fixture 1 by these projecting threaded shafts 72. More specifically, the threaded shafts 72 are inserted into holes (not shown) in a rail member 80 from therebelow, the rail member 80 that is a part of the on-roof installation object; the rail member 80 is placed on the top plate 51 of the cover member 50; and is fastened thereto by nuts 77 screwed onto the threaded shafts 72. By this, the rail member 80 is brought into a state in which it is mounted on the fixture 1, and the on-roof installation object is brought into a state in which it is fixed to the under roofing material 60 via the fixture 1.

When projection positions of the threaded shafts 72 are shifted in the roof horizontal direction from the position where the rail member 80 is to be fixed to the under roofing material 60, it is possible to adjust the projection positions of the threaded shafts 72 by sliding the bolts 70 along the fixing member mounting parts 34.

In the present embodiment, the following fixing structure is provided by using the fixture 1 as described above. That is, the fixing structure of the on-roof installation object is one in which the substitutive roof member 10 is used in place of the roof member 65 and is mounted on the under roofing material 60; with the gap provided between the mounting base 30 and the top face opening 15 in the substitutive roof member 10, the mounting base 30 is mounted on the under roofing material 60; and the on-roof installation object is fixed via the bolts 70 that are mounted to the fixing member mounting parts 34 of the mounting base 30.

Accordingly, according to the present embodiment, the substitutive roof member 10 is made of an aluminum alloy, which is used as a metal. Therefore, compared to that made of a ceramic, variations in product dimensions are small, and dimensional precision of the product is high, so that it is possible to provide the substitutive roof member 10 so that the gap between the top face opening 15 and the mounting base 30 is made as small as possible. Consequently, by reducing the size of the gap between the mounting base 30 and the top face opening 15 of the substitutive roof member 10, it becomes easy to recognize any displacement of the mounting base 30 with respect to the top face opening 15, so that it is easy to position the mounting base 30 with respect to the substitutive roof member 10.

The pair of guide surfaces 16 of the substitutive roof member 10 can guide the mounting base 30 from the top face opening 15 up to the vicinity of the under roofing material 60. Therefore, the mounting base 30 is easily brought into contact with the under roofing material 60 with the mounting base 30 positioned with respect to the top face opening 15, so that mounting workability with respect to the under roofing material 60 is good.

Further, since the mounting base 30 has a form in which the rising walls 32 are each erected from the inner side of a corresponding one of the pair of bottom plates 31, the rising walls 32 are positioned inwardly from the outer sides of the bottom plates 31; and, when the mounting base 30 is inserted into the top face opening 15 in the substitutive roof member 10, a space into which operator's fingers can be inserted is provided between the top face opening 15 and each rising wall 32. Therefore, even in a state in which the mounting base 30 has been inserted in the top face opening 15 in the substitutive roof member 10 and brought into contact with the under roofing material 60, the operator can grasp the pair of rising walls 32, so that the positioning of the mounting base 30 with respect to the substitutive roof member 10 is easily performed.

In addition, since the top face 14 of the substitutive roof member 10 is provided with the identification parts 17 that extend parallel to the roof inclination direction, it is possible to easily position the mounting base 30 with respect to the substitutive roof member 10 by aligning the recessed parts 39 of the mounting base 30 with the identification parts 17.

Since the substitutive roof member 10 includes the pair of projecting strips 18, it is possible prevent rainwater from flowing down to the under roofing material 60. More specifically, when, with the fixture 1 mounted on the under roofing material 60, the rainwater flows down onto the base part 11 of the substitutive roof member 10 from the ridge side of the roof, since the tubular wall 13 has a surface that is bent in the ridge direction, the rainwater flows along the outer wall of the tubular wall 13 without being stopped by the tubular wall 13, after which the rainwater is about to flow around to the eaves side of the tubular wall 13. However, the rainwater is prevented from flowing around to the eaves side of the tubular wall 13 by the projecting strips 18, so that the rainwater is almost never discharged to the eaves side through a space between the pair of projecting strips 18. Therefore, since the rainwater is not discharged from the substitutive roof member 10 onto where roof members 65 arranged in a staggered form overlap each other so as to cover the roof, it becomes difficult for the rainwater to flow into a space between the roof members, so that, at the roof members 65 at the eaves side of the substitutive roof member 10, the rainwater can be prevented from flowing down to the under roofing material 60.

Since the top plate 51 of the cover member 50 is placed on the plurality of placement projecting parts 38 of the mounting base 30 in order to mount the rail member 80 thereon, the placement projecting parts 38, the top plate 51, and the rail member 80 are brought into a state in which they successively contact each other. Since elastic members, such as the seal rings 75, are not interposed between the placement projecting parts 38 and the top plate 51, rattling does not occur when mounting the rail member 80, so that the on-roof installation object can be fixed in a stable state.

Although the present invention is described by way of a preferred embodiment, the present invention is not limited to the above-described embodiment. Various modifications and changes in design may be made in a range without departing from a scope of the present invention.

For example, in the above-described embodiment, the case in which the pair of guide surfaces 16 of the substitutive roof member 10 each extend downward from partial length of a corresponding one of a pair of opposing peripheral sides among the peripheral sides of the top face opening 15 is described. However, the present invention is not limited thereto. The pair of guide surfaces 16 may each extend downward from the entirety of the corresponding one of the pair of opposing peripheral sides.

Although, in the above-described embodiment, the identification parts 17 in the form of grooves are described, the present invention is not limited thereto. The identification parts may include protrusions, seals, or other forms.

Further, although, in the above-described embodiment, an example in which the bolts 70 are mounted to the fixing member mounting parts 34 of the mounting base 30 is described, the present invention is not limited thereto. As fixing members, nuts, such as hexagon head nuts, square nuts, or T-slot nuts, may be mounted to the fixing member mounting parts 34. In this case, by screwing the bolts from a side of the rail member 80 onto the nuts mounted to the fixing member mounting parts 34 and by tightening the bolts, it is possible to mount the rail member 80 on the fixture 1.

As with the base part 11 of the substitutive roof member 10, the roof member 65 according to the above-described embodiment is such that an eaves-side end portion thereof at a portion where it overlaps a lower portion of an adjacent roof member 65 in the roof horizontal direction is disposed closer to the ridge side than an eaves-side end portion thereof at a remaining portion is. On the other hand, there is known a roof member 66 whose eaves side end portion at the corresponding portion is not disposed closer to the ridge side than an eaves-side end portion at the remaining portion is, that is, a roof member 66 whose eaves-side end portion extends in a constant manner in the horizontal direction. When the substitutive roof member 10 is used with respect to such a roof member 66, an eaves-side end portion of the roof member 66 that overlaps a lower portion of the substitutive roof member 10 in the roof horizontal direction contacts the substitutive roof member 10. Therefore, it is necessary to cut off this part of the roof member 66. In contrast, as shown in FIGS. 6 to 9, a substitutive roof member 10B including a bulging part 24 may be used. The bulging part 24 bulges in the eaves direction from an inner side at an eaves-side end portion, at a portion that overlaps from above the roof member 66 in the roof horizontal direction. By this, even if the corresponding portion of the roof member 66 (indicated by alternate long and two short dash lines in FIG. 9) is not cut off, the substitutive roof member 10B can overlap the roof member 66, so that the mounting operation of the fixture 1 with respect to the under roofing material 60 is facilitated.

The substitutive roof member 10B is such that an eaves-side end portion at a side opposite to the bulging part 24 in the roof horizontal direction is disposed closer to the ridge side as in the substitutive roof member 10 (roof member 65). This allows the substitutive roof member 10B to be also used in place of the roof member 65. In an embodiment in FIGS. 6 to 9, a bolt 70 is mounted to the center fixing member mounting part 34 of the three fixing member mounting parts 34 of the mounting base 30, and only one through hole 53 is provided in the cover member 50. Even this embodiment provides the same advantageous effects as those provided by the above-described embodiment.

In the above-described embodiment, as the roof member 65 that is substituted by the substitutive roof member 10, an example in which the roof member 65 having the following structure and substituted by the substitutive roof member 10 is described, that is, the structure in which, of the two end portions in the roof horizontal direction, the eaves-side end portion at the end-portion side that overlaps from below the adjacent roof member 65 is situated closer to the ridge side than the eaves-side end at the remaining portion is. However, the present invention is not limited thereto. A structure in which the substitutive roof member 10 is used in place of the roof member 66 having a structure in which the eaves-side end portion at the end portion side is provided up to the same position as the eaves-side end portion at the remaining portion may be used. In this case, of the roof member 66 that is adjacent to the substitutive roof member 10 in the roof horizontal direction, the roof member 66 having an end-portion side that overlaps from below the substitutive roof member 10 can overlap the substitutive roof member 10 when the eaves-side end portion at this end-portion side is cut off in the direction of the ridge side.

What is claimed is:

1. A fixture for an on-roof installation object, the fixture comprising:
   a substitutive roof member that includes a plate-like base part, a base opening, a tubular wall, a top face, and a pair of first guide surfaces, the base opening penetrating the base part, the tubular wall being erected from a peripheral edge of the base opening, the top face extending inwardly in a form of a plate from a top end of the tubular wall and forming a top face opening that is smaller than the base opening, the pair of first guide surfaces each extending downward from a corresponding one of peripheral sides of the top face opening so as to oppose each other, the substitutive roof member being used in place of a roof member and being made of a metal or a synthetic resin; and
   a mounting base that includes a pair of planar bottom plates, a pair of rising walls, a pair of extending parts, a pair of second guide surfaces, a connection part, and a fixing member mounting part, the planar bottom plates being provided in a row in such a size as to pass through the top face opening in the substitutive roof member, each rising wall being erected from an entire length of an inner-side side of a corresponding one of the pair of bottom plates, the extending parts extending sideways from a corresponding one of the rising walls to an outside edge of the bottom plates, the second guide surfaces extending along the outside edge from a corresponding one of the extending parts, the connection part connecting upper sides of the pair of rising walls, the fixing member mounting part being exposed at a top surface of the connection part for mounting a bolt or a nut, wherein the pair of the second guide surfaces is guided by the pair of the first guide surfaces as the mounting base is inserted into the top face opening of the substitutive roof member.

2. The fixture for an on-roof installation object according to claim 1, wherein the substitutive roof member further includes an identification part that is provided at the top face so as to be disposed on a line passing between the pair of first guide surfaces, and that extends parallel to the peripheral sides, from which the first guide surfaces extend downward, of the top face opening.

3. The fixture for an on-roof installation object according to claim 1, wherein the substitutive roof member further includes a pair of projecting strips that project from a top surface of the base part at locations that are closer to an eaves side than the tubular wall extend in a direction connecting an eaves end and a ridge end, and are spaced from a center in a direction at right angles to the direction connecting the eaves end and the ridge end.

4. The fixture for an on-roof installation object according to claim 2, wherein the substitutive roof member further includes a pair of projecting strips that project from a top surface of the base part at locations that are closer to an eaves side than the tubular wall extend in a direction connecting an eaves end and a ridge end, and are spaced from a center in a direction at right angles to the direction connecting the eaves end and the ridge end.

5. A fixing structure of an on-roof installation object, comprising a fixture, in which the on-roof installation object is fixed to a under roofing material, the fixture further comprising:

a substitutive roof member that includes a plate-like base part, a base opening, a tubular wall, a top face, and a pair of first guide surfaces, the base opening penetrating the base part, the tubular wall being erected from a peripheral edge of the base opening, the top face extending inwardly in a form of a plate from a top end of the tubular wall and forming a top face opening that is smaller than the base opening, the pair of first guide surfaces each extending downward from a corresponding one of peripheral sides of the top face opening so as to oppose each other, the substitutive roof member being used in place of a roof member and being made of a metal or a synthetic resin; and a mounting base that includes a pair of planar bottom plates, a pair of rising walls, a pair of extending parts, a pair of second guide surfaces, a connection part, and a fixing member mounting part, the planar bottom plates being provided in a row in such a size as to pass through the top face opening in the substitutive roof member, each rising wall being erected from an entire length of an inner-side side of a corresponding one of the pair of bottom plates, the extending parts extending sideways from a corresponding one of the rising walls to an outside edge of the bottom plates, the second guide surfaces extending along the outside edge from a corresponding one of the extending parts, the connection part connecting upper sides of the pair of rising walls, the fixing member mounting part being exposed at a top surface of the connection part for mounting a bolt or a nut, wherein the substitutive roof member is used in place of the roof member and is mounted on the under roofing material, and, with a gap provided between the mounting base and the top face opening in the substitutive roof member, the mounting base is mounted on the under roofing material, and wherein the on-roof installation object is fixed via the bolt or the nut that is mounted to the fixing member mounting part of the mounting base, wherein the pair of the second guide surfaces is guided by the pair of the first guide surfaces as the mounting base is inserted into the top face opening of the substitutive roof member.

* * * * *

UNITED STATES PATENT AND TRADEMARK OFFICE
CERTIFICATE OF CORRECTION

PATENT NO. : 9,853,595 B1  
APPLICATION NO. : 15/240716  
DATED : December 26, 2017  
INVENTOR(S) : Katsuyuki Okado Page 1 of 1

It is certified that error appears in the above-identified patent and that said Letters Patent is hereby corrected as shown below:

In the Claims

In Claim 3 in Column 15 on Line 5 --is,-- should be inserted between "wall" and "extend".

In Claim 4 in Column 15 on Line 13 --is,-- should be inserted between "wall" and "extend".

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*